US009908609B1

(12) United States Patent
Fourie

(10) Patent No.: US 9,908,609 B1
(45) Date of Patent: Mar. 6, 2018

(54) EXPLOSIVE STRIP FOR VENTING GAS FROM A BALLOON

(71) Applicant: X Development LLC, Mountain View, CA (US)

(72) Inventor: Daniel Henry Fourie, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/171,274

(22) Filed: Jun. 2, 2016

(51) Int. Cl.
*B64B 1/46* (2006.01)
*F42C 19/12* (2006.01)
*F42C 19/02* (2006.01)

(52) U.S. Cl.
CPC ............ *B64B 1/46* (2013.01); *F42C 19/02* (2013.01); *F42C 19/12* (2013.01)

(58) Field of Classification Search
CPC .... B64B 1/40; B64B 1/44; B64B 1/46; B64B 1/48; B64B 1/58; B64B 1/62; B64B 1/70; F42B 19/12; F42B 19/02
See application file for complete search history.

(56) References Cited

U.S. PATENT DOCUMENTS

| 2,756,948 A * | 7/1956 | Winzen ................. B64B 1/40 244/31 |
| 2,900,147 A | 8/1959 | Huch et al. |
| 2,931,597 A | 4/1960 | Moore, Jr. |
| 3,041,019 A | 6/1962 | Froehlich |
| 3,119,578 A | 1/1964 | Borgeson et al. |
| 3,131,889 A | 5/1964 | Yost |
| 3,229,932 A * | 1/1966 | Yost ................. B64B 1/62 244/152 |
| 3,302,906 A | 2/1967 | Winker |

(Continued)

FOREIGN PATENT DOCUMENTS

| DE | 490525 C * | 1/1930 | ............ B64C 31/06 |
| DE | 3025414 A1 * | 2/1982 | ............ B64B 1/40 |

(Continued)

OTHER PUBLICATIONS

Anatine_aero. Bovine Aerospace. The sky is not our limit. Tag Archives: weather balloon. Jun. 5, 2013, 14 pages. Retrieved from <http://bovineaerospace.wordpress.com/tag/weather-balloon/>.

*Primary Examiner* — Benjamin P Lee
(74) *Attorney, Agent, or Firm* — Lerner, David, Littenberg, Krumholz & Mentlik, LLP

(57) ABSTRACT

Aspects of the disclosure relate to terminating flight of a balloon that may include separating a connection between a balloon envelope and a payload of the balloon. In one example, a payload separation apparatus includes a first shaft configured to attach to the envelope, a second shaft configured to attach to the payload, a pair of arms, and a bracket arranged to secure the pair of arms to the first shaft. In another example, a system includes a flight termination assembly having a cutting edge configured to cut an opening in the envelope and a payload separation apparatus. The apparatus includes a first shaft configured to attach to the envelope, a second shaft configured to attach to the payload, a pair of arms, and a bracket configured to secure the pair of arms to the first shaft. The system also includes a controller configured to activate the cutting edge.

20 Claims, 6 Drawing Sheets

(56) References Cited

U.S. PATENT DOCUMENTS

| | | | |
|---|---|---|---|
| 3,451,649 A | 6/1969 | Weiss et al. | |
| 3,614,031 A | 10/1971 | Demboski | |
| 3,679,155 A | 7/1972 | Centofanti | |
| 3,860,201 A | 1/1975 | Hall | |
| 4,042,192 A * | 8/1977 | Walter | B64B 1/62 244/152 |
| 4,077,588 A | 3/1978 | Hurst | |
| 4,262,864 A | 4/1981 | Eshoo | |
| 4,402,476 A * | 9/1983 | Wiederkehr | B64B 1/62 244/31 |
| 4,432,513 A | 2/1984 | Yost | |
| 4,434,958 A | 3/1984 | Rougeron et al. | |
| 4,494,714 A | 1/1985 | Hill et al. | |
| 4,651,956 A | 3/1987 | Winker et al. | |
| 5,149,019 A | 9/1992 | Stenlund | |
| 5,538,451 A | 7/1996 | Sherer | |
| 5,992,795 A | 11/1999 | Tockert | |
| 6,234,425 B1 | 5/2001 | Rand et al. | |
| 6,325,329 B1 | 12/2001 | Meadows | |
| 6,628,941 B2 | 9/2003 | Knoblach et al. | |
| 7,203,491 B2 | 4/2007 | Knoblach et al. | |
| 7,275,496 B2 | 10/2007 | French et al. | |
| 7,356,390 B2 | 4/2008 | Knoblach et al. | |
| 7,648,102 B2 | 1/2010 | French et al. | |
| 7,801,522 B2 | 9/2010 | Knoblach et al. | |
| 8,256,716 B2 | 9/2012 | Dietrich et al. | |
| 8,644,789 B2 | 2/2014 | Knoblach et al. | |
| 8,882,026 B2 | 11/2014 | Huens | |
| 9,139,278 B1 | 9/2015 | Roach et al. | |
| 9,296,462 B1 * | 3/2016 | Brookes | B64B 1/46 |
| 2002/0175243 A1 | 11/2002 | Black et al. | |
| 2003/0018351 A1 | 1/2003 | Kaji et al. | |
| 2004/0238692 A1 | 12/2004 | Kavanagh | |
| 2005/0006523 A1 | 1/2005 | French et al. | |
| 2005/0014499 A1 | 1/2005 | Knoblach et al. | |
| 2005/0224639 A1 | 10/2005 | Kavanagh | |
| 2006/0192054 A1 | 8/2006 | Lachenmeier | |
| 2007/0199503 A1 | 8/2007 | French et al. | |
| 2009/0272840 A1 | 11/2009 | Dietrich et al. | |
| 2010/0123040 A1 | 5/2010 | Baxter et al. | |
| 2011/0297784 A1 | 12/2011 | Huens | |
| 2013/0066267 A1 | 3/2013 | Kwok et al. | |
| 2013/0261547 A1 | 10/2013 | Aggerholm et al. | |
| 2014/0014770 A1 | 1/2014 | Teller et al. | |
| 2014/0203135 A1 | 7/2014 | Walter | |
| 2014/0277059 A1 | 9/2014 | Lam et al. | |
| 2014/0367511 A1 | 12/2014 | Knoblach et al. | |
| 2015/0266560 A1 | 9/2015 | Ratner et al. | |
| 2016/0207605 A1 * | 7/2016 | Jensen | B64B 1/40 |
| 2016/0214716 A1 * | 7/2016 | Knoblach | B64B 1/42 |

FOREIGN PATENT DOCUMENTS

| | | | |
|---|---|---|---|
| DE | 102010028542 B3 * | 7/2011 | B64B 1/62 |
| GB | 555831 A | 9/1943 | |
| GB | 749791 A | 5/1956 | |
| JP | H03262797 A | 11/1991 | |
| JP | 10157697 | 6/1998 | |
| WO | 1995/004407 A1 | 2/1995 | |

* cited by examiner

400

EXPLOSIVE STRIP FOR VENTING GAS FROM A BALLOON

BACKGROUND

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network. Because of the various forces experienced by these balloons during deployment and operation, there is a balancing of needs between flexibility and stability of materials. As such, the balloons include a flexible envelope made of material that may be configured in sections or lobes to create a "pumpkin" or lobed balloon. These lobes are supported by a plurality of tendons. During normal operations, the balloon envelope is filled with gas so that it can float above the Earth. At some point, the balloon may need to be brought back to the ground, for example, for retrieval, maintenance or servicing of balloon components.

BRIEF SUMMARY

One aspect of the disclosure provides a system for terminating flight of a balloon having a balloon envelope. The system includes an explosive strip arranged between two support tendons of the balloon envelope as well as a detonating squib including an ignitor. The ignitor is configured to, when activated, explode the explosive strip and create an opening in the balloon envelope to allow lift gas to escape. The system also includes a controller configured to send a signal to the detonating squib in order to activate the ignitor.

In one example, the two support tendons run from a top cap to a base cap of the balloon, and the explosive strip is arranged along a portion of the balloon envelope between the top cap and the base cap and between the two support tendons. In this example, each of the two support tendons is arranged on a respective gore of the balloon envelope between two gore seals that separate gores of the balloon envelope. In addition, the explosive strip is arranged on only one of the respective gores. In this example, the explosive strip is arranged between one of the two tendons and a gore seal.

In another example, the two support tendons run from a top cap to a base cap of the balloon, and the explosive strip is arranged to run from the top cap to the base cap between the two support tendons. In another example, the system also includes the balloon. In another example, the controller is incorporated into a payload of the balloon. In another example, the length of explosive strip has a detonation cord rating of 1 gram per meter or less. In another example, the system also includes a second explosive strip arranged between two second support tendons of the balloon envelope different from the two support tendons. In another example, the explosive strip is arranged on a first gore of the balloon envelope and the second explosive strip is arranged on a second gore of the balloon envelope opposite of the first gore. In another example, the length of explosive strip is configured as an explosive cord that includes an explosive fuel and an oxidizer. In another example, the explosive strip is configured to explode and create the opening in less than 1 second. In another example, the length of explosive strip is arranged in a sleeve attached to the balloon envelope. In this example, the sleeve allows the explosive strip to contact a surface of the balloon envelope.

In another example, the detonating squib includes an atmospheric pressure airlock to prevent activation of the ignitor below a certain altitude. In another example, the explosive strip does not contact a gore seal of the balloon envelope. In another example, the explosive strip does not cross over a tendon of the balloon envelope. In another example, the explosive strip is attached to the balloon envelope using an adhesive. In another example, the balloon envelope includes a top cap and a base cap, and wherein a first end of the explosive strip is oriented towards the top cap and a second end of the explosive strip is oriented towards the base cap.

DETAILED DESCRIPTION

Figure 1:
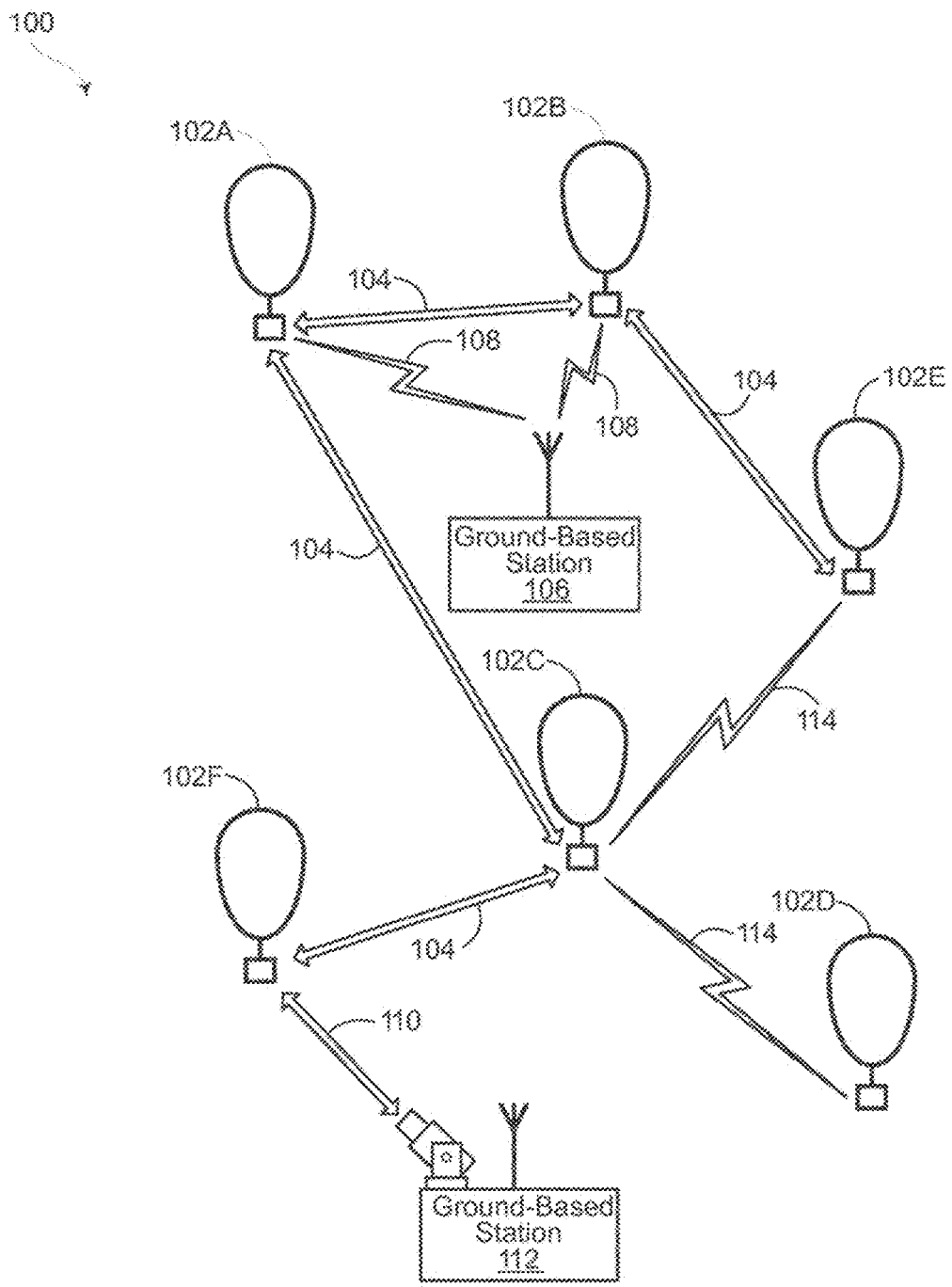
FIG. 1 is a functional diagram of a network in accordance with to aspects of the disclosure.

The technology relates to flight termination systems for high altitude balloons such as those used in communication networks. A single network may include a large number of balloons, each of which includes a balloon envelope, a payload including a solar panel, and a cable or other connection between the envelope and the payload. It eventually becomes necessary to bring these balloons back to earth. Typical flight termination systems may involve cutting open the balloon envelope using a knife or other sharp instrument. Typically, this cutting requires a second or more to fully complete. During this time however, the shape of the balloon envelope changes by collapsing on itself making the path of the descending balloon unpredictable. The movement of the balloon envelope can be even more unpredictable (or difficult to predict) where the balloon envelope is only partially inflated or pressurized. For instance, cutting or tearing methods.

In order to reduce the amount of time to complete the opening in the balloon envelope, a termination system including an explosive strip, a detonating squib, and a controller may be used. As an example, the explosive strip may include commercially available detonating cord which includes an oxidizer and explosive fuel within a cord such as detonating cords which are used for underwater explosions. Because of this configuration, the explosive strip can be expected to perform reliably at high altitudes. In addition, because the explosive strip explodes (as opposed to burning) the speed at which the explosive strip explodes (which can be several miles per minute), provides for a near instantaneous creation of an opening in a balloon envelope. Moreover given the material of the balloon envelope is a relatively thin plastic, the rating of the detonation cord used may be very low, making it safer for handling.

The explosive strip may be arranged on the balloon envelope during or after manufacturing of the balloon. As an example, the explosive strip may be attached using adhesive or placed within a sleeve that allows the explosive strip to directly contact the balloon envelope. In one example, to reduce the need for the explosive strip to have to cut through the tendons of the balloon envelope, the explosive strip may be arranged on a gore between a tendon and a gore seam. The explosive strip may start or end at any point between the top cap and the bottom cap depending upon the size of the opening to be created in the balloon envelope.

The detonating squib may be arranged to receive a signal from the controller and ignite the explosive strip. In that regard, the detonating squib may be configured to receive the signal which activates an electronic ignitor of the detonating squib. The electronic ignitor may cause the detonating squib to activate the explosive strip and create an opening in the balloon envelope.

The controller may be a remote or local controller. In that regard, the controller may be located at the detonating squib, another location on the balloon (such as the top cap, base cap, or payload), or remote from the balloon such as at a location on the ground. In that regard, when an operator is ready to terminate the flight of the balloon, the operator may activate the termination system, for instance using the controller directly or by sending a signal to the controller remotely, thereby causing the controller to send the signal to the detonating squib to cut the opening in the balloon envelope.

The termination system may thus provide a simple, reliable, and cost effective solution for terminating the flight of a balloon. As noted above, because the explosive strip acts nearly instantaneously, the effect on the balloon envelope in much more predictable than systems which can take a second or more to create an opening in the balloon envelope. In addition, the explosive strip may work much better than other methods in instances where the balloon is only partially inflated or pressurized. For instance, cutting or tearing methods are very dependent on the tension in the balloon film as well as the shape of the balloon film (it might be folded or creased or bunched up). Both of these characteristics depend on and can differ dramatically, when the balloon is fully or only partially inflated or pressurized. At the same time, the explosive strip can have the same effect on the balloon envelope regardless of the level of inflation or pressure.

Further, in balloons using ignitable lift gasses such as hydrogen, because of the amount of oxygen in the stratosphere is relatively low and the force of the shockwave caused by the explosion of the explosive strip that would push the hydrogen from the balloon envelope away from the oxygen in the stratosphere away immediately after the explosion, the likelihood of a large explosion caused by the released hydrogen is relatively low.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

Example Balloon Network

FIG. 1 depicts an example network 100 in which a balloon as described above may be used. This example should not be considered as limiting the scope of the disclosure or usefulness of the features of the flight termination system as described herein. For example, the flight termination system can be employed on various types of balloons, such as balloons carrying telescopes, surveillance gear, weather sensors or other types of standalone balloons or balloons used with other types of systems. In this example, network 100 may be considered a "balloon network." The balloon network 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
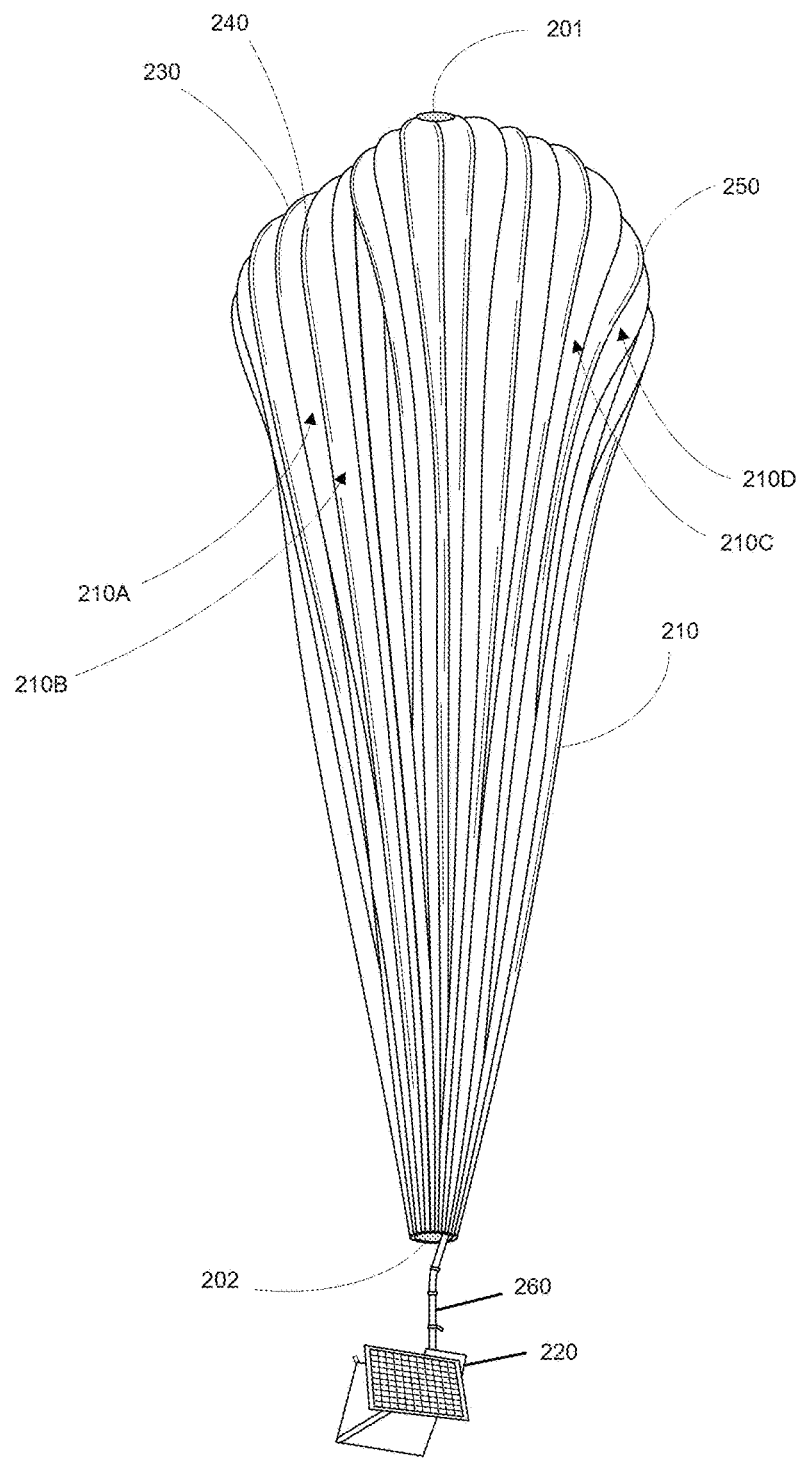
FIG. 2 is an example of a balloon in accordance with aspects of the disclosure.

FIG. 2 is an example balloon 200, which may represent any of the balloons of balloon network 100. As shown, the balloon 200 includes an envelope 210, a payload 220 and a plurality of tendons 230, 240 and 250 attached to the envelope 210.

The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 is affixed to the envelope by a connection 260 such as a cable. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope. In this example, balloon envelope 210 is comprised of envelope gores 210A-210D.

Figure 3:
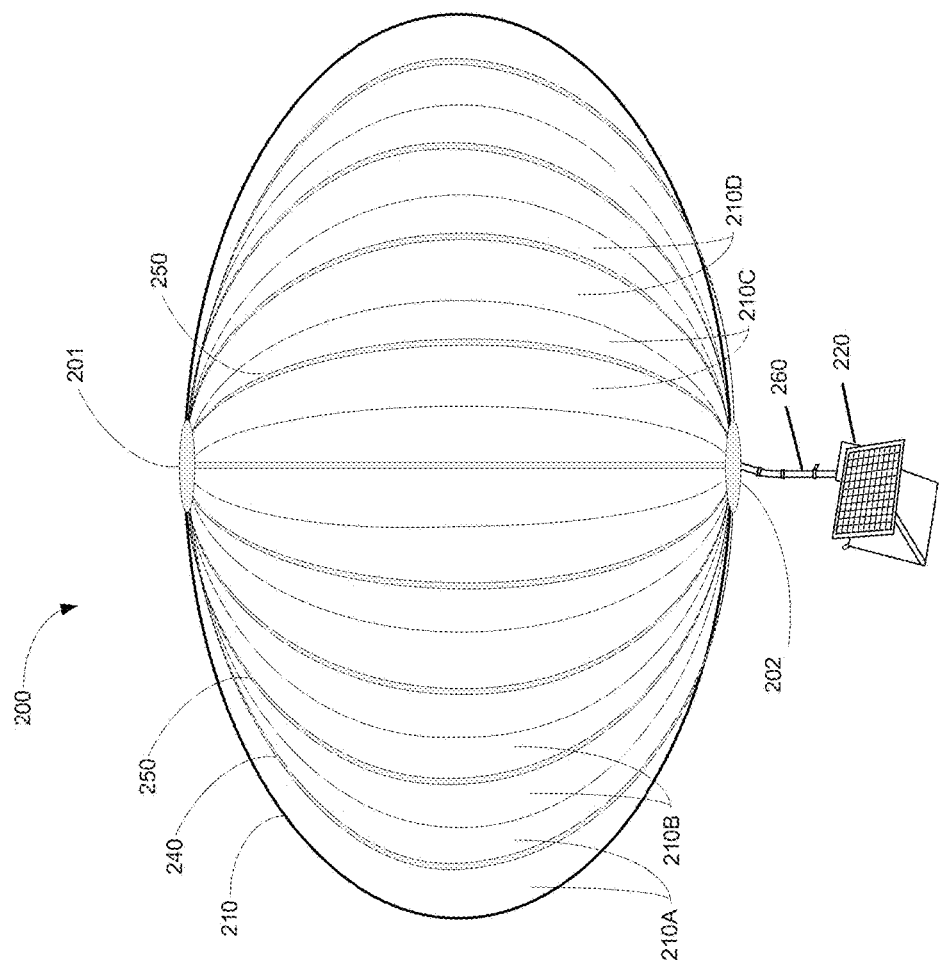
FIG. 3 is another example of a balloon in accordance with aspects of the disclosure.

Pressurized lift gas within the balloon envelope 210 may cause a force or load to be applied to the balloon 200. In that regard, the tendons 230-250 provide strength to the balloon 200 to carrier the load created by the pressurized gas within the balloon envelope 210. As shown more clearly in FIG. 3, the tendons are arranged along a centerline of each of the gores 210A-210B rather than at the seams between the gores. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using a type of plate, such as top cap 201 positioned at the apex of balloon envelope 210. Bottom ends of the tendons 230, 240 and 250 may also be connected to one another. For example, a corresponding plate, e.g., bottom cap 202, is disposed at a base or bottom of the balloon envelope 210. The top cap 201 at the apex may be the same size and shape as and bottom cap 202 at the bottom. Both caps include corresponding components for attaching the tendons 230, 240 and 250. In some examples, the top cap 201 may serve a mounting point for certain systems attached to the balloon 200.

FIG. 2 depicts the balloon envelope 210 inflated with lift gas close to ground level, for instance, at atmospheric pressure. As the balloon rises and the atmospheric pressure drops, the lift gas within the balloon envelope expands changing the shape of the balloon envelope. Eventually, for instance, when the balloon envelope reaches the stratosphere, the lift gas in the balloon envelope causes the balloon envelope to form more of a rounded pumpkin shape depicted in FIG. 3.

During normal operations, the balloon 200 floats in the air like other balloons in the network. However, there are different situations in which the balloon 200 may need to be brought back to the ground. For example, a user may need to bring down the balloon 200 on purpose, for example, to perform maintenance or for retrieval and inspection of certain balloon components.

Example Flight Termination System

Figure 4:
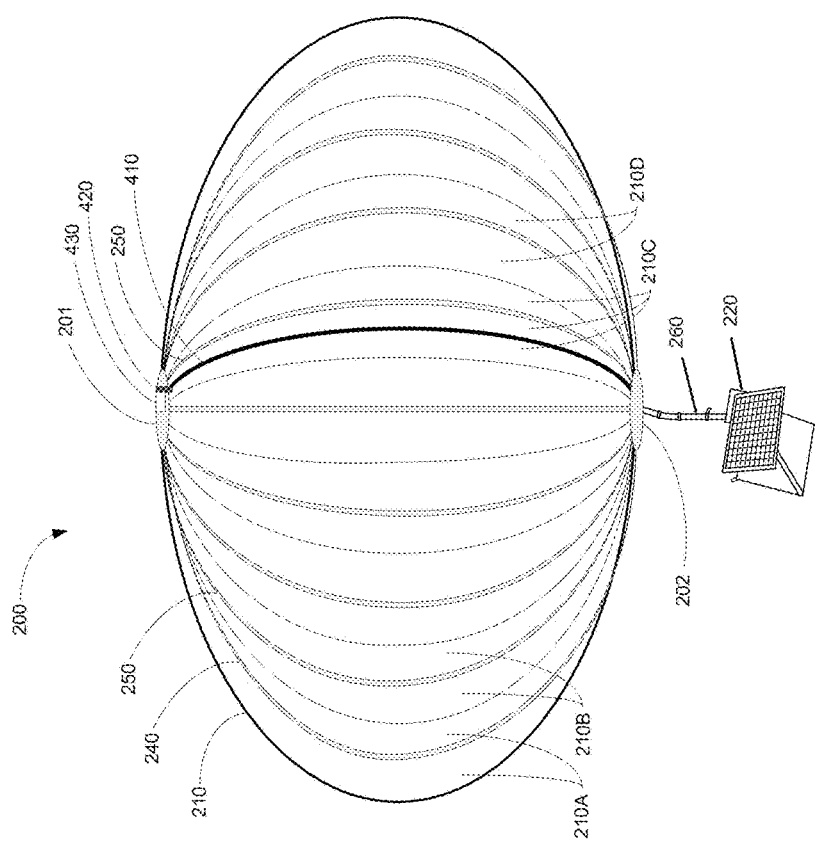
FIG. 4 is an example of a flight termination system in accordance with aspects of the disclosure.
Figure 5:
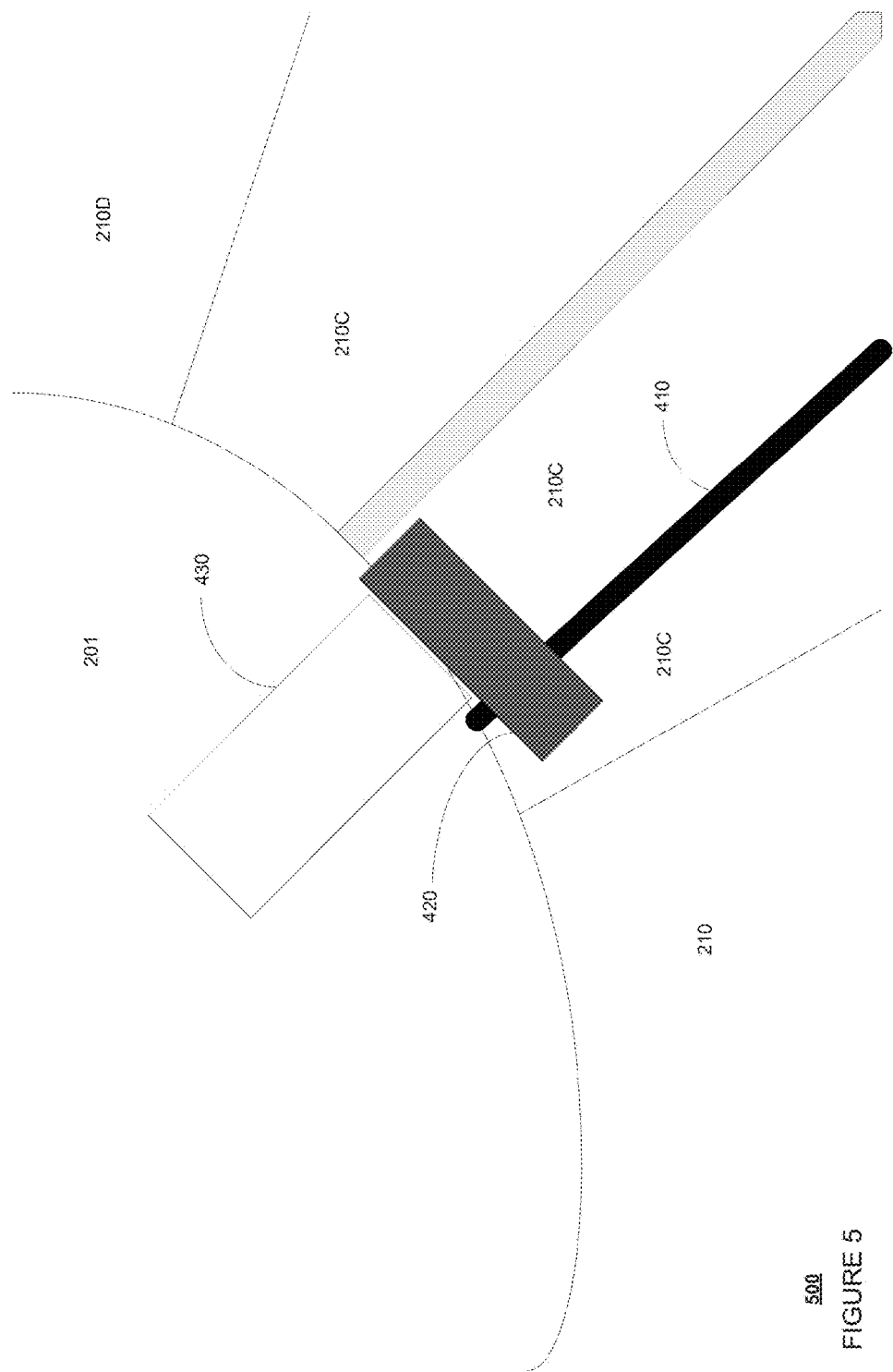
FIG. 5 is a detail view of a portion of a flight termination system in accordance with aspects of the disclosure.

In order to terminate a flight, a balloon may include a flight termination system. The flight termination system may be configured to create (rather than simply cut) a hole into the balloon envelope. For example, FIG. 4 depicts a termination system 400 including an explosive strip 410, a detonating squib 420, and a controller 430 arranged on the balloon envelope 210. FIG. 5 is a detail view of the termination system.

As an example, the explosive strip 410 may include commercially available detonating cord which includes an oxidizer and explosive fuel within cord such as detonating cords which are used for underwater explosions. Because of this configuration, the explosive strip can be expected to perform reliably at high altitudes, such as in the stratosphere where the available oxygen for an explosion can be quite low and temperatures can be as low as −80 degrees Celsius. In addition, because the explosive strip explodes (as opposed to burning) the speed at which the explosive strip explodes (which can be several miles per minute), provides for a near instantaneous creation of an opening in a balloon envelope. Moreover given the material of the balloon envelope is a relatively thin polyethylene sheet, the rating of the detonation cord used may be very low such as 1 gram per meter (or 5 grains per meter) or even less. Thus, this type of explosive strip is much safer for handling than higher rated detonating cords.

The explosive strip 410 may be arranged on the balloon envelope during or after manufacturing of the balloon. As an example, the explosive strip may be attached using adhesive or placed within a sleeve that allows the explosive strip to directly contact the balloon envelope. In one example, to reduce the need for the explosive strip to have to cut through the tendons of the balloon envelope, the explosive strip may be arranged on a gore, such as gore 210C, adjacent to a tendon, such as tendon 250, as shown in FIGS. 4 and 5. In this regard, the explosive strip 410 may operate to explode open the balloon envelope, as opposed to a seam between two gores or tendon. Of course, the explosive strip 410 may also be placed along a gore seam between two gores or along a tendon.

The explosive strip may start or end at any point between the top cap and the bottom cap depending upon the size of the opening to be created in the balloon envelope. In the examples of FIGS. 4 and 5, the explosive strip starts at (or adjacent to) the top cap 201, and as shown in FIG. 4, runs along the entire length of gore 210C and ends at (or adjacent to) the base cap 202. Again, depending upon the size of an opening to be made in the balloon envelope (which corresponds to the amount of balloon envelope to be exploded), the explosive strip need not run the entire distance between the top cap and base cap.

The detonating squib 420 may be arranged to receive a signal from the controller 420 and ignite the explosive strip. In that regard, the detonating squib 420 must be arranged adjacent to some portion of the explosive strip 410, rally at any point along the length of the explosive strip 410. The detonating squib may be connected by wire or wirelessly (via a receiver) to the controller 420. This connection may thus allow the explosive squib to receive the signal and, in response, to activate an electronic ignitor. The electronic ignitor may cause the detonating squib 420 to activate the explosive strip and create an opening in the balloon envelope.

The controller may be a remote or local controller. As shown in FIGS. 4 and 5, controller 430 is arranged adjacent to the detonating squib at the top cap 201. In this example, the controller 430 is located directly adjacent to the detonating squib 420 in order to allow the controller to communicate via wire with the detonating squib. Of course, the controller may be arranged at other portions of the balloon, such as at some point along the explosive strip 410 at the balloon envelope 210, the base cap 202, payload 220, etc. or at some remote location (such as the ground). In these examples, the controller may be configured to communicate with the detonating squib via a transmitter which sends a signal to a receiver of the detonating squib.

The controller 430 may also be configured to receive a signal, for instance wirelessly via a receiver, from a location remote from the balloon such as at a location on the ground. In that regard, when an operator is ready to terminate the flight of the balloon, the operator may activate the termination system, for instance using the controller directly or by sending a signal to the controller remotely, thereby causing the controller to send the signal to the detonating squib to create an opening in the balloon envelope.

In this regard, the controller 430 may be a very simple device that receives a signal via a receiver and sends that signal directly to the detonation squib to activate the electronic ignitor. Alternatively, the controller may be more complex, for instance including one or more processors, memory, as well other components typically present in computing devices. As an example, the memory stores information accessible by the one or more processors, including instructions and data that may be executed or otherwise used by the processor. The memory may be of any type capable of storing information accessible by the processor, including a non-transitory computer-readable medium or other medium that stores data that may be read with the aid of an electronic device, such as a hard-drive, memory card, ROM, RAM, DVD or other optical disks, as well as other write-capable and read-only memories. The instructions may be any set of instructions to be executed directly (such as machine code) or indirectly (such as scripts) by the processor. For example, the instructions may be stored as computing device code on the computer-readable medium. The instructions may be stored in object code format for direct processing by the processor, or in any other computing device language including scripts or collections of independent source code modules that are interpreted on demand or compiled in advance. The data may be retrieved, stored or modified by processor 120 in accordance with the instructions. The one or more processor may be any conventional processors, such as commercially available CPUs. Alternatively, the one or more processors may be a dedicated device such as an ASIC or other hardware-based processor. The processor, computing device, or memory may actually include multiple processors, computing devices, or memories that may or may not be stored within the same physical housing.

Figure 6:
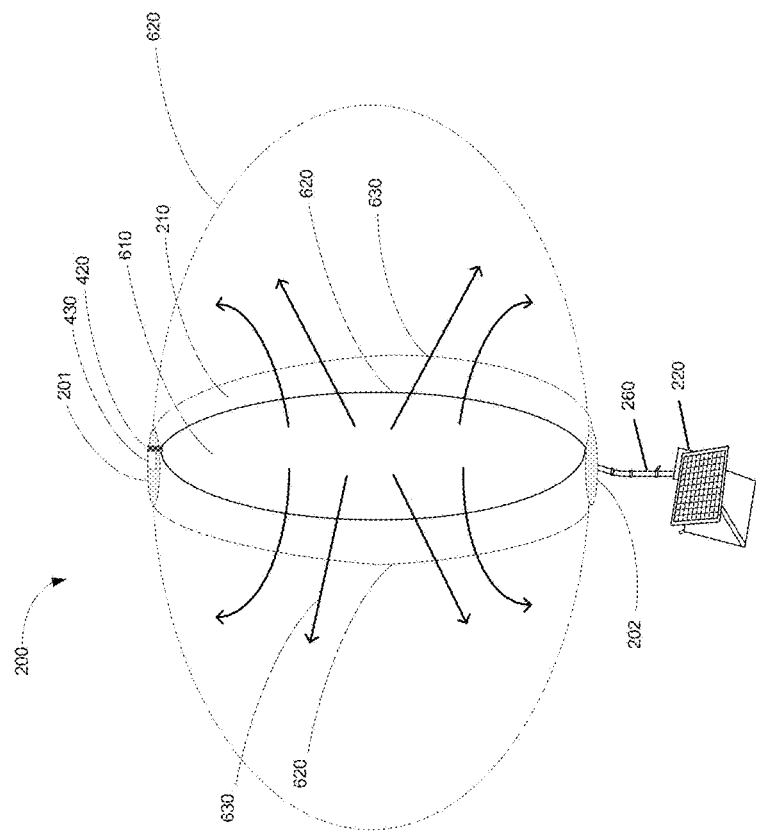
FIG. 6 is an example view of an activated flight termination system in accordance with aspects of the disclosure.

When an operator is ready to terminate the flight of a balloon, the operator may use the controller (or send a signal to the controller) to activate the detonating squib. This in turn causes the detonating squib to activate the electronic ignitor. The ignitor then ignites the explosive strip causing a near instantaneous explosion along the entire length of the explosive strip. In other words, the entire explosive strip explodes in well under a second and essentially disintegrates the balloon envelope creating an opening in the balloon envelope that allows lift gas to escape. Turning to example 600 of FIG. 6, the explosion creates an opening 610 in the balloon envelope 210. The opening 610 has an outer edge 620 that is double the length of the explosive strip. In this example, because the explosive strip ran the entire distance between the top cap 201 and the base cap 202, the opening 610 also runs the entire distance between the top cap 201 and the base cap 202. In this regard, the opening is so large as to allow the lift gas in the balloon envelope to escape (as indicated by arrows 630). This changes the shape of the balloon envelope 210 (the pre-exploded shape indicated by dashed line 620), relatively quickly providing for a fairly predictable descent of the balloon.

In some examples, the termination system may include a plurality of explosive strips arranged at different gores of the balloon. For example, two explosive strips may be arranged on opposing gores in order to create opposing openings in the balloon envelope. In this example, a single controller may send a signal to two different detonation squibs in order to explode each of the explosive strips thereby creating two openings as discussed above. Of course, any number of detonation chards with various other arrangements may also be used.

In some examples, various safety features may be used to prevent premature activation of the detonator. As an example, a safety interlock such as an atmospheric pressure airlock for the squib to prevent activation of the detonator during manufacturing, transport, launch, and even when the balloon is in flight at lower altitudes. In addition or alternatively, during manufacturing, the connection between the detonator and the explosive strip and/or the ignitor may be left off of the termination system. In that regard, the connection and/or ignitor may be made or added immediately prior to launch such as when the balloon is positioned for filling, etc.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for terminating flight of a balloon having a balloon envelope, the system comprising:
    an explosive strip arranged between two support tendons of the balloon envelope; and
    a detonating squib including an ignitor configured to, when activated, explode the explosive strip and create an opening in the balloon envelope to allow lift gas to escape; and
    a controller configured to send a signal to the detonating squib in order to activate the ignitor.

2. The system of claim 1, wherein the two support tendons run from a top cap to a base cap of the balloon, and the explosive strip is arranged along a portion of the balloon envelope between the top cap and the base cap and between the two support tendons.

3. The system of claim 2, wherein each of the two support tendons is arranged on a respective gore of the balloon envelope between two gore seals that separate gores of the balloon envelope.

4. The system of claim 3, wherein the explosive strip is arranged on only one of the respective gores.

5. The system of claim 4, wherein the explosive strip is arranged on only one of the respective gores between one of the two tendons and a gore seal.

6. The system of claim 1, wherein the two support tendons run from a top cap to a base cap of the balloon, and the explosive strip is arranged to run from the top cap to the base cap between the two support tendons.

7. The system of claim 1, further comprising the balloon.

8. The system of claim 1, wherein the controller is incorporated into a payload of the balloon.

9. The system of claim 1, wherein the explosive strip has a detonation cord rating of 1 gram per meter or less.

10. The system of claim 1, further including a second explosive strip arranged between two second support tendons of the balloon envelope different from the two support tendons.

11. The system of claim 1, wherein the explosive strip is arranged on a first gore of the balloon envelope and a second explosive strip is arranged on a second gore of the balloon envelope opposite of the first gore.

12. The system of claim 1, wherein the explosive strip is configured as an explosive cord that includes an explosive fuel and an oxidizer.

13. The system of claim 1, wherein the explosive strip is configured to explode and create the opening in less than 1 second.

14. The system of claim 1, wherein the explosive strip is arranged in a sleeve attached to the balloon envelope.

15. The system of claim 14, wherein the sleeve allows the explosive strip to contact a surface of the balloon envelope.

16. The system of claim 1, wherein the detonating squib includes an atmospheric pressure airlock to prevent activation of the ignitor below a certain altitude.

17. The system of claim 1, wherein the explosive strip does not contact a gore seal of the balloon envelope.

18. The system of claim 1, wherein the explosive strip does not cross over a tendon of the balloon envelope.

19. The system of claim 1, wherein the explosive strip is attached to the balloon envelope using an adhesive.

20. The system of claim 1, wherein the balloon envelope includes a top cap and a base cap, and wherein a first end of the explosive strip is oriented towards the top cap and a second end of the explosive strip is oriented towards the base cap.

\* \* \* \* \*